(12) United States Patent
Radhakrishnan et al.

(10) Patent No.: US 11,122,809 B2
(45) Date of Patent: Sep. 21, 2021

(54) BIO-STIMULANT COMPOSITION FOR IMPROVED PLANT GROWTH AND THE PROCESS OF PREPARING THE SAME

(71) Applicant: COROMANDEL INTERNATIONAL LIMITED, Telangana (IN)

(72) Inventors: Ramamurthi Radhakrishnan, Cuddalore (IN); Chinnasamy Balakumar, Cuddalore (IN); Sadhasivam Kathiresan, Cuddalore (IN); Arun Venkatachalam, Chennai (IN); Lakshmikanthan Baburaj, Chennai (IN)

(73) Assignee: COROMANDEL INTERNATIONAL LIMITED, Secunderabad (IN)

( * ) Notice: Subject to any disclaimer, the term of this patent is extended or adjusted under 35 U.S.C. 154(b) by 0 days.

(21) Appl. No.: 16/739,315

(22) Filed: Jan. 10, 2020

(65) Prior Publication Data

US 2020/0221709 A1 Jul. 16, 2020

Related U.S. Application Data

(63) Continuation of application No. 15/571,733, filed as application No. PCT/IB2016/051364 on Mar. 10, 2016, now Pat. No. 10,624,352.

(30) Foreign Application Priority Data

May 6, 2015 (IN) .......................... 2310/CHE/2015
May 6, 2015 (IN) .......................... 2311/CHE/2015

(51) Int. Cl.
| | | |
|---|---|---|
| A61K 36/00 | (2006.01) |
| A01N 65/00 | (2009.01) |
| A01N 43/90 | (2006.01) |
| C05F 11/00 | (2006.01) |
| A01N 65/08 | (2009.01) |
| C05G 5/30 | (2020.01) |
| A01N 25/12 | (2006.01) |

(52) U.S. Cl.
CPC ............. *A01N 65/00* (2013.01); *A01N 25/12* (2013.01); *A01N 43/90* (2013.01); *A01N 65/08* (2013.01); *C05F 11/00* (2013.01); *C05G 5/30* (2020.02); *A01N 2300/00* (2013.01)

(58) Field of Classification Search
None
See application file for complete search history.

(56) References Cited

U.S. PATENT DOCUMENTS

| | | |
|---|---|---|
| 5,958,104 A | 9/1999 | Nonomura et al. |
| 6,676,976 B2 | 1/2004 | Chattopadhyay et al. |
| 2007/0280981 A1 | 12/2007 | Birthisel |

FOREIGN PATENT DOCUMENTS

| | | |
|---|---|---|
| CN | 1182539 A | 5/1998 |
| IN | 201101335 | 11/2012 |
| IN | 200701225 | 12/2018 |
| WO | 2005077393 A1 | 8/2005 |
| WO | 2006097700 | 9/2006 |
| WO | 2007046113 A2 | 4/2007 |

OTHER PUBLICATIONS

Abdalla, M.M., "The potential of Moringa oleifera extract as a biostimulant in enhancing the growth, biochemical and hormonal contents in rocket (*Eruca vesicaria* subp.sativa) plants," International Journal of Plant Physiology and Biochemistry, vol. 5(3), pp. 42-49, Sep. 2013.
Crouch, I.J. et al., "Effect of seaweed concentrate from *Ecklonia maxima* (Osbeck) Papenfuss on Meloidogyne incognita infestation on tomato," Journal of Applied Phycology, vol. 5, pp. 37-43, 1993.
PCT International Search Report and Written Opinion dated Jun. 22, 2016 for International Application No. PCT/IB2016/051364, 7 pages.
Yang, E. et al., "Inhibitory effect of Jeju endemic seaweeds on the production of pro-inflammatory mediators in mouse macrophage cell line RAW 264.7," J Zhejiang Univ-Sci B (Biomed & Biotechnol), vol. 11(5), pp. 315-322, 2010.

*Primary Examiner* — Qiuwen Mi
(74) *Attorney, Agent, or Firm* — RMCK Law Group, PLC

(57) ABSTRACT

The present invention discloses a bio-stimulant composition for promoting plant growth comprising natural product based extracts, such as, *Adhatoda zeylanica* extract containing Vasicine, *Moringa oleifera* extract, algal extract and combinations thereof, and excipients, and a process for preparing the same.

14 Claims, 1 Drawing Sheet

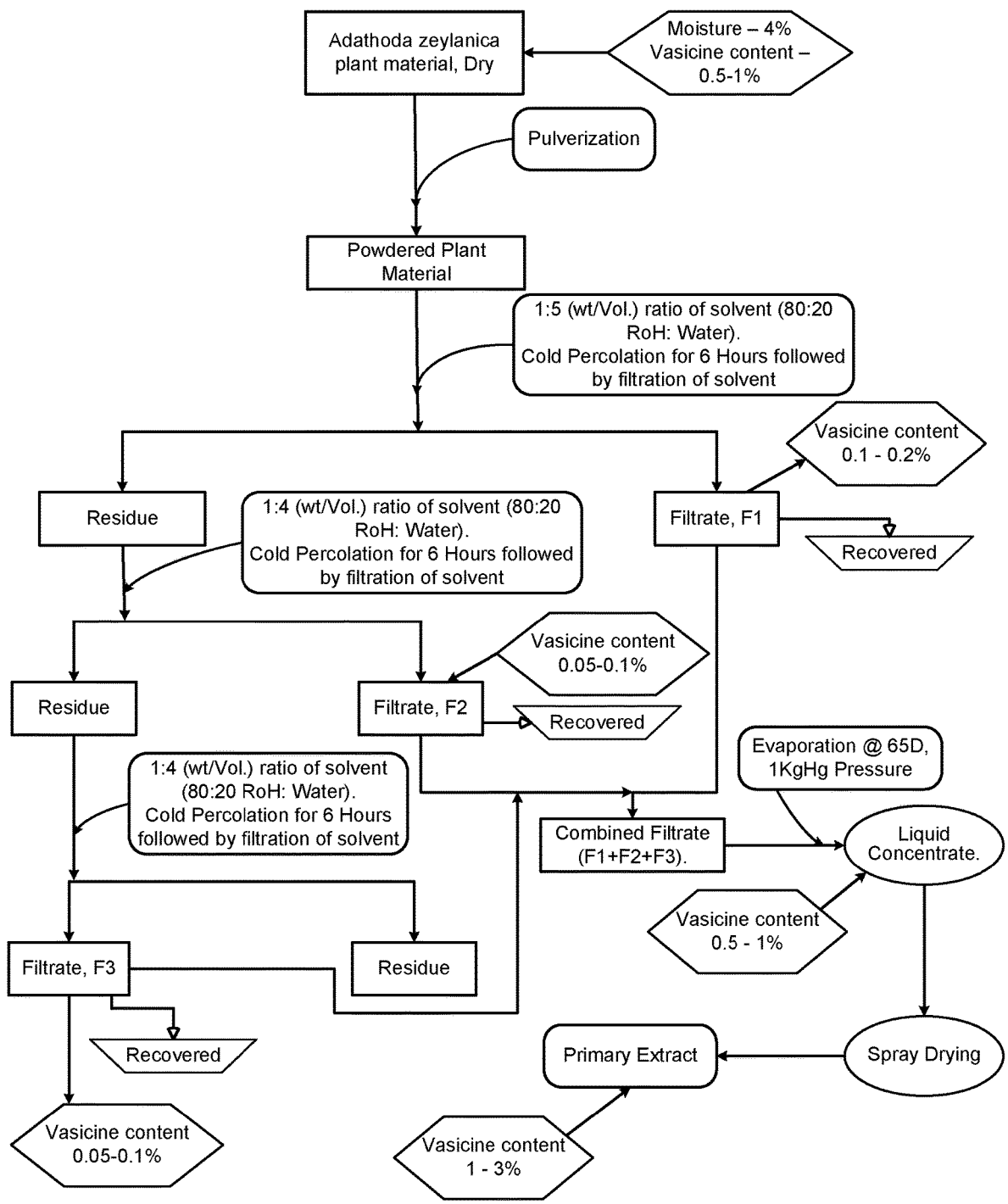

BIO-STIMULANT COMPOSITION FOR IMPROVED PLANT GROWTH AND THE PROCESS OF PREPARING THE SAME

PRIORITY AND CROSS REFERENCE TO RELATED APPLICATIONS

This application is a continuation of U.S. application Ser. No. 15/571,733, filed Nov. 3, 2017, which is the U.S. National Stage Application Under 35 U.S.C. § 371 of International Application No. PCT/IB2016/051364, filed Mar. 10, 2016, designating the U.S. and published in English as WO 2016/178101 A1 on Nov. 10, 2016, which claims the benefit of Indian Patent Application No. IN 2310/CHE/2015, filed May 6, 2015 and Indian Patent Application No. IN 2311/CHE/2015, filed May 6, 2015. Any and all applications for which a foreign or a domestic priority is claimed is/are identified in the Application Data Sheet filed herewith and is/are hereby incorporated by reference in their entirety under 37 C.F.R. § 1.57.

FIELD

The present invention relates to a bio-stimulant composition comprising herbal extracts and the process of preparing the same.

BACKGROUND OF THE INVENTION

Plant growth is dictated by both internal and external factors. The internal mechanisms originate in the genetic makeup of the plant and influence the extent and timing of its growth. These internal mechanisms are regulated by signals of various types transmitted within the plant cells, between the cells, or all around the plant itself. The external factors are directly related to the immediate environment surrounding the plant. These external influences affect plant growth and include factors such as water, nutrients, temperature, light, fertilizers, pesticides, bio-stimulants etc. The external environment can place constraints on the extent to which internal mechanisms can permit the plant to grow and develop, with two of the most important factors being related to the availability of water and nutrient supplies in the soil.

Cell expansion is directly related to water supply, and thus any deficit results in a smaller plant. Mineral nutrients are needed for the biochemical processes of the plant. When nutrients are in insufficient supply, growth will be less vigorous, or in extreme cases, it will cease altogether. The nutrients necessary for plant growth include the primary macronutrients Nitrogen (N), Phosphorous (P), and Potassium (K); the secondary macronutrients Calcium (Ca), Sulphur (S), and Magnesium (Mg); and the micronutrients or trace minerals Boron (B), Chlorine (Cl), Manganese (Mn), Iron (Fe), Zinc (Zn), Copper (Cu), Molybdenum (Mo), and Selenium (Se). Optimal temperatures are also necessary for plant growth. The required temperature range will depend on the species, but most plants grow slowly at low temperatures, i.e., 0° C. to 10° C., and some tropical plants are damaged or even killed at low but above-freezing temperatures. Light is also important in the control of plant growth, in that it drives the process of photosynthesis.

Plant bio-stimulants are components other than fertilizers that affect plant growth and/or metabolism upon foliar application or when added to soil. Plant bio-stimulants generally fall within one of these categories i.e. hormone-containing products, plant extract based products, micronutrients based products, amino acid-containing products and humic acid-containing products but may not be strictly restricted to these categories alone. Plant bio-stimulants are used to treat crops in a commercial setting in view of their ability to increase growth rates, increase stress tolerance, increase photosynthetic rate and increase disease tolerance. Plant bio-stimulants are generally believed to operate by up-regulating or down-regulating plant hormones.

Despite the commercially availability of numerous fertilizers and plant bio-stimulants, there continues to be a demand for improved products capable of serving a variety of needs. Therefore new products and methods for improving plant growth responses and development are needed.

*Adhatoda zeylanica* (commonly known as *Adhatoda vasica*, Malabar Nut, Adulsa, *Adhatoda*, Vasa, Vasaka, *vasica*) belonging to family Acanthaceae is a small, evergreen shrub found mainly in regions of India and throughout the world, with a multitude of uses in traditional Ayurveda. Apart from Ayurveda, this herb has been used for treatment of various diseases and disorders in Unani also. *vasica* is most well-known for its effectiveness in treating respiratory conditions. The leaves of *vasica* are known to show stimulant effect on the respiratory system. *vasica* shows an antispasmodic and expectorant effect, and has been used for centuries with much success to treat asthma, chronic bronchitis, and other respiratory conditions. The phytochemical studies of the various parts of *Adhatoda zeylanica* revealed the presence of alkaloids, phytosterols, polyphenolics and glycosides as a major class of compounds. Its principal constituents are quinazoline alkaloids with Vasicine as its main alkaloid.

In agriculture, extracts of *Adhatoda zeylanica* bark, leaves, and flower have also been used to eradicate living red spider mites and eggs from leaves, where this plant has also shown certain efficacy. However, there were no reports concerning the use of *Adhatoda zeylanica* as bio-stimulant, which can be defined as substance that is neither a plant nutrient nor a pesticide, but has a positive impact on plant health. In other words, a bio-stimulant is an organic material that, when applied in small quantities, enhances plant growth and development such that the response cannot be attributed to application of traditional plant nutrients.

*Moringa oleifera* (also called Horseradish tree or Drumstick tree) is a plant originally found in the Himalayan regions of India. The plant belongs to the family of Moringaceae. It is a shrub and small deciduous tree of 2.5 m to 10 m in height. When matured, the fruit becomes brown and has 10-50 seeds inside (Vlahof et al., 2002). This plant is popularly grown in Africa, the Middle East, southeastern Asia, the Pacific Islands, the Caribbean Islands and southern America and is now widely planted in Taiwan and China. In India, the leaf and fruit of *M. oleifera* were originally used as vegetables with the root acting as a substitute for horseradish in cooking. This plant was also reported to contain various amino acids, fatty acids, vitamins, and nutrients (Nesamani, 1999). The constituents of the *M. oleifera* tree, such as the leaf, flower, fruit, and bark have been anecdotally used as herbal medicines in treatments for inflammation, paralysis, and hypertension. Moreover, many reports indicate that *M. oleifera* has highly potent anti-inflammatory (Ezeamuzle et al., 1996), hepatoprotective (Pari and Kumar, 2002), antihypertensive (Faizi et al., 1995) and antitumor (Murakami et al., 1998) properties in humans. Also, its seed has strong coagulative and anti-microbial properties (Eilert et al., 1981). The seed oil has physical and chemical properties equivalent to that of olive oil and contains a large quantity of tocopherols (Tsaknis et al., 1999). The leaf extracts in rats were found to regulate thyroid status and cholesterol levels (Tahiliani et al., 2000; Ghasi, 2000). Therefore it can be developed as a useful agent to treat high cholesterol. The screening of various parts of *M. oleifera* revealed the presence of various phytochemicals among which quercetin is the main flavonoid.

The use of *Moringa oleifera* extract as a biostimulant in enhancing the growth, biochemical and hormonal contents in rocket plants (*Eruca vesicaria* subsp. *sativa*) has been well documented (Int. J. Plant Physiol. Biochem. Vol. 5(3), pp. 42-49, September 2013).

Algae, seaweed, and seaweed derived products have been widely used in agriculture as an enhancer due to the presence of a number of plant growth stimulating compounds in them. Galactans, carrageenans and agars present in cell wall of red seaweeds are known to aid seed germination, elongate root and retain moisture in the soil. Furthermore, seaweed extracts are also a rich source of macronutrients (N, P, K, Ca, S, Mg) and micronutrients (Fe, Mn, Co, Cu) which are present in metalloprotein active sites.

Various methods of extraction of Vasicine from *Adhatoda zeylanica* extract are known in the art. According to a prior art process Vasicine can be isolated from the leaves of *Adhatoda zeylanica* by extracting the leaves of the plant with 95% alcohol, treating the concentrated alcoholic extract with aqueous 2% $H_2SO_4$, basifying the aqueous acidic solution with ammonia and extracting with chloroform, concentrating the chloroform gave an extract which was again dissolved in aqueous 2% $H_2SO_4$ and repeating the process of basification with ammonia, followed by extraction with chloroform (C. K. Atal. "Chemistry and Pharmacology of Vasicine—A new oxytoxic and abortifacient." Raj. Bandhu Ind. Co., New Delhi, 1980). The drawback of the process include use of strong mineral acid like $H_2SO_4$ for extraction which results in considerable degradation of Vasicine, which is further aggravated by repeating the process of same mineral acid treatment twice.

In another prior art, Vasicine was isolated from *Adhatoda zeylanica* leaves as follows (D. R. Mehta, J. S. Naravane and R. M. Desai. Vasicinone. A Bronchodilator Principle from *Adhatoda vasica* Nees (N. O. Acanthaceae) J. Org. chem. 28, 445-448, 1963). The leaves were refluxed with 90% alcohol and after evaporation of the solvent, the alcohol extract thus obtained was extracted with hot distilled water and the aqueous extract was filtered. The filtrate was extracted with chloroform to remove the coloring matter and then made alkaline with 5% caustic soda, and again extracted with chloroform. The combined chloroform extracts were extracted with 5% hydrochloric acid, and then acidic solution was made alkaline with ammonia and again extracted with chloroform. After repeating the process twice the final chloroform extract was concentrated to give a crude total alkaloid from which Vasicine was isolated as Vasicine hydrochloride (yield: 2 g). The first drawback of the above process includes the extraction of the alcohol extract with hot water, with further limitations like (a) Vasicine could not be quantitatively extracted from its aqueous solution and (b) hot water extraction will convert Vasicine into its auto oxidation product vasicinone. Second drawback of the process is the use of 5% mineral acid like hydrochloric acid for its extraction and that also, twice. The use of strong mineral acid degrades Vasicine considerably and thus results in a lower yield of Vasicine.

U.S. Pat. No. 6,676,976 B2 discloses an improved process for the production of Vasicine from the *Adhatoda vasica* said process comprising the steps of extracting the dried and pulverized leaves with an alcoholic extract at an ambient temperature, concentrating the alcoholic extract to obtain a concentrated extract, treating and stirring extract with an aqueous organic acid for 2-24 hours, extracting the acid solution with an organic solvent, separating the organic layer and aqueous acidic layer, basifying the aqueous acidic solution with a base, extracting the basified solution with an organic solvent, separating the organic layer, drying and filtering, evaporating the organic layer to obtain an amorphous residue, and treating the amorphous residue with an organic solvent or mixture of organic solvents to obtain Vasicine. Even this process suffers from the drawbacks of using corrosive acids and low yields.

In view of the above discussion, there is a need for a process that extracts Vasicine from *Adhatoda zeylanica* plant in an effective manner. There is also a need to explore the use of *Adhatoda zeylanica* extract containing Vasicine as a bio-stimulant for plant growth promotion and identify its suitable formulation for application in agriculture.

SUMMARY OF THE INVENTION

In accordance with an embodiment of the invention, there is provided a bio-stimulant composition, comprising *Adhatoda zeylanica* extract containing Vasicine and a plurality of excipients and wherein *Adhatoda zeylanica* extract containing Vasicine is present in an amount in the range from 0.05-50.00% w/w.

In accordance with another embodiment of the invention, the excipients in the bio-stimulant composition include a carrier, a colorant and an adhesive and the bio-stimulant composition is in the form of granules.

In accordance with another embodiment of the invention, the granular bio-stimulant composition optionally comprises *Moringa oleifera* extract in an amount in the range from 0.05-1.00% w/w.

In accordance with another embodiment of the invention, the granular bio-stimulant composition optionally comprises algal extract in an amount in the range from 0.01-1.00% w/w.

In accordance with another embodiment of the invention, the carrier is selected from the group consisting of quartz sand, bentonite and combinations thereof, and wherein the carrier is present in an amount in the range from 48.50-98.35% w/w.

In accordance with another embodiment of the invention, the colorant is present in an amount in the range from 0.01-0.40% w/w.

In accordance with another embodiment of the invention, the adhesive is selected from the group consisting of beeswax, paraffin wax, vegetable wax and combinations thereof, and the adhesive is present in an amount in the range from 0.05-4.00% w/w.

In accordance with another embodiment of the invention, the excipients are selected from the group consisting of a non-ionic surfactant, a stabilizer, a filler, a solvent and combinations thereof, and the composition is in the form of a liquid for foliar application or drip application.

In accordance with another embodiment of the invention, the non-ionic surfactant is selected from the group consisting of Polyoxy ethylene (20) sorbitan mono laurate, Polyoxy ethylene sorbitan mono oleate, Polyoxy ethylene (20) sorbitan tri oleate, Polyoxy ethylene sorbitan mono stearate, Polyoxy ethylene sorbitan mono palmitate and combinations thereof and wherein the non-ionic surfactant is present in an amount in the range from 45.00-80.00% w/w.

In accordance with another embodiment of the invention, the stabilizer is selected from the group consisting of epoxidized vegetable oil, ethoxylated vegetable oil, hydrogenated vegetable oil and combinations thereof and the stabilizer is present in an amount in the range from 0.00-5.00% w/w.

In accordance with another embodiment of the invention, the filler is selected from the group consisting of sunflower oil, sesame oil, castor oil and combinations thereof and wherein the filler is present in an amount in the range from 3.00-50.00% w/w.

In accordance with another embodiment of the invention, the solvent is selected from the group consisting of propanol, butanol, iso propyl alcohol, ethanol and combinations thereof and present in an amount in the range from 15.00-25.00% w/w.

In accordance with another embodiment of the invention, there is provided a process for preparing a granular bio-stimulant composition, comprising the steps of: (a) coating the carrier material with a layer of adhesive to obtain a first granular mixture; (b) coating *Adhatoda zeylanica* extract containing Vasicine and colorant, and optionally *Moringa* extract or algal extract onto the first granular mixture and drying to obtain a second granular mixture; and (c) coating the second granular mixture with a layer of adhesive and drying to form the granular bio-stimulant composition.

BRIEF DESCRIPTION OF DRAWINGS

FIG. 1 is a flowchart for preparing a primary extract of *Adhatoda zeylanica*.

DETAILED DESCRIPTION OF THE INVENTION

Discussed below are some representative embodiments of the present invention. The invention in its broader aspects is not limited to the specific details and representative methods. The illustrative examples are described in this section in connection with the embodiments and methods provided. The invention according to its various aspects is particularly pointed out and distinctly claimed in the attached claims read in view of this specification.

It is to be noted that, as used in the specification and the appended claims, the singular forms "a," "an," and "the" include plural referents unless the context clearly dictates otherwise. Thus, for example, reference to a composition containing "a compound" includes a mixture of two or more compounds. It should also be noted that the term "or" is generally employed in its sense including "and/or" unless the content clearly dictates otherwise.

A ratio, having the unit w/v, refers to the ratio of weight (measured in grams) to volume (measured in millilitres). A ratio having the unit v/v refers to a ratio of volumes (measured in units for volume). All other ratios, refer to ratios of weights (measured in units of mass).

The expression of various quantities in terms of "% w/w" or "%" means the percentage by weight of the total solution or composition unless otherwise specified.

All cited references are incorporated herein by reference in their entireties. Citation of any reference is not an admission regarding any determination as to its availability as prior art to the claimed invention.

The present invention, in its product and process aspects, is described in detail as follows.

The present invention relates to a bio-stimulant composition comprising herbal extracts and a plurality of excipients and the process of preparing the same.

The bio-stimulant composition may be formulated in the form of granules containing extracts selected from the group of *Adhatoda zeylanica* extract containing Vasicine, *Moringa oleifera* extract and algal extract, each of which can be used individually or in combination, and other excipients. The term "bio-stimulant" used herein refers to substances and materials, with the exception of nutrients and pesticides, which, when applied to plants, seeds or growing substrates in specific formulations have the ability to modify the physiological processes of plants, in a way that provides potential benefits to growth, development and/or stress response. The granular bio-stimulant composition, comprises *Adhatoda zeylanica* extract containing Vasicine in an amount in the range from 0.05-50.00%, *Moringa oleifera* extract in an amount in the range from 0.05-1.00% and the algal extract is present in an amount in the range from 0.01-1.00%.

The granular bio-stimulant composition also contains a lipophilic adhesive to bind the active material to the carrier. Adhesive is present in an amount in the range from 0.05-4.00%, and is selected from the group consisting of beeswax, paraffin wax, vegetable wax and so forth, each of which can be used either individually or in combination.

The granular bio-stimulant composition further comprises a carrier and a colorant. Bio-stimulant compositions may be applied as granular formulations that are particularly useful for application to the soil. Granular formulations contain the bio-stimulant dispersed in a carrier that comprises quartz sand or a similar substance, such as, bentonite. Such formulations are usually prepared by dissolving the bio-stimulant composition in a suitable solvent and applying it to a granular carrier which has been pre-formed to the appropriate particle size. The carrier used in the present invention is quartz sand or bentonite, wherein the carrier is present in an amount in the range from 48.50-98.35%.

The term "colorant" used herein is a substance added to the composition to cause a change in colour. Colorants can be dyes, pigments, or coloured chemicals. They are generally added to a composition to make it attractive and visually appealing to the consumer. The colorant is present in an amount in the range from 0.01-0.40%.

The bio-stimulant composition of another embodiment of the present invention can be formulated as a liquid for foliar or drip application, comprising: (a) *Adhatoda zeylanica* extract containing Vasicine; and (b) at least one excipient selected from the group consisting of a non-ionic surfactant, a stabilizer, a filler, a solvent and combinations thereof. The liquid bio-stimulant composition contains *Adhatoda zeylanica* extract containing Vasicine, in an amount in the range from 0.05-50.00%.

The active compounds, present in the herbal extracts are prone to degradation on exposure to high temperatures and oxidation on exposure to atmosphere. Under such conditions, unprotected storage, or storage for very long periods of time can easily result in the liquid bio-stimulant composition losing its efficacy or becoming altogether unusable. Accordingly, the liquid bio-stimulant composition of the present invention contains a stabilizer in order to protect the active herbal compounds from thermal degradation and oxidation on storage. The liquid bio-stimulant composition contains a stabilizer in an amount in the range from 0.00-5.00%. Non limiting examples of stabilizers used in the present invention include epoxidized vegetable oil, ethoxylated vegetable oil, hydrogenated vegetable oil and so forth, each of which can be used individually or in combination.

A common formulation applied for foliar application to plants is called an emulsifiable concentrate (EC). The primary inert ingredient in a product formulated as an EC is an emulsifier, i.e., a detergent like substance that makes it possible for the active herbal component to mix with water. One class of emulsifiers are known as "surface active agents", or surfactants. Accordingly, the liquid bio-stimulant of the present invention consists of a non-ionic surfactant, wherein said non-ionic surfactant is present in an amount in the range from 45.00-80.00%. Non-limiting examples of the non-ionic surfactants used in the present invention include Polyoxy ethylene (20) sorbitan mono laurate, Polyoxy ethylene sorbitan mono oleate, Polyoxy ethylene (20) sorbitan tri oleate, Polyoxy ethylene sorbitan mono stearate, Polyoxy ethylene sorbitan mono palmitate and so forth, each of which can be used individually or in combination.

A filler is an inert substance that is generally used in a composition to improve its storage and handling characteristics. Accordingly, said liquid bio-stimulant composition further comprises agrochemically acceptable fillers, wherein said filler is present in an amount in the range from 3.00-50.00%. Non-limiting examples of fillers used in the present invention include sunflower oil, sesame oil, castor oil and combinations thereof.

The bio-stimulant composition in the form of a liquid for drip application contains a solvent selected from the group consisting of propanol, butanol, iso propyl alcohol, ethanol and combinations thereof in an amount preferably in the range from 15.00-25.00% and more preferably 20.00%.

The present invention also provides a process for preparing Adhatoda zeylanica extract containing Vasicine. The process includes (a) pulverizing a dried part of Adhatoda zeylanica; (b) subjecting said pulverized part to a plurality of extractions by cold percolation with a suitable solvent; (c) evaporating said solvent to form a liquid concentrate; (d) drying said liquid concentrate to form a primary extract; (e) mixing said primary extract with water to form a mixture; (f) subjecting said mixture to a plurality of extractions with ethyl acetate to give Adhatoda zeylanica extract containing Vasicine.

Vasicine, which is the active compound present in Adhatoda zeylanica, is localized in the leaves, stem, and flowers of the plant. Prior to extraction by cold percolation, the plant is dried and pulverized. The dried part selected for extraction can be a flower, stem, leaf or the whole plant.

The term "cold percolation" used herein is a traditional method of extraction used by herbalists. The set up consists of a cone or tube suspended above a vessel or a flask. The bottom of the tube or flask has a perforated base which holds the pulvarized plant material in place. Solvent is poured into the top of the tube from where it percolates down the herbal material leaching out the active components and then passing out through the bottom end of the tube into the vessel. The suitable solvent used in cold percolation may be any solvent that is capable of extracting Vasicine from the plant material. The suitable solvent is selected from the group consisting of methanol, water, ethyl acetate and ethanol, each of which can be used either individually or in combination. The suitable solvent used preferably in cold percolation is a mixture of methanol and water in the ratio of 80:20.

Multiple extractions of the plant material by cold percolation are performed to extract Vasicine. After each extraction, the solvent is separated from the pulverized plant material by filtration. The filtrate from all the extraction steps are combined and concentrated by evaporating the solvent to form a liquid concentrate. The liquid concentrate is preferably spray dried to obtain a primary extract. The term "spray dried" used herein refers to a process of producing a dried powder from a liquid or slurry by rapidly drying with a hot gas. This is the preferred method for drying thermally sensitive herbal extracts. Heated air is generally the preferred drying medium; however, if the herbal extracts contain inflammable solvents such as methanol, ethanol and so forth, or antioxidants sensitive to oxidation by oxygen hot nitrogen gas is used as the drying medium.

The primary extract is mixed with water and ethanol to form a mixture, which is subjected to multiple extractions with ethyl acetate. All the ethyl acetate extracts are combined and used for preparing the bio-stimulant composition.

The present invention is more particularly described in the following non-limiting examples that are intended as illustrations only, since numerous modifications and variations within the scope of the present invention will be apparent to a skilled artisan. Unless otherwise noted, all parts, percentages, and ratios reported in the following examples are on a weight basis, and all reagents used in the examples were obtained or made available from the chemical suppliers. Algal Extract was procured from E.I.D Parry (India) Ltd, Nutraceuticals Division.

Example 1

Process for Preparing the Primary Extract of Adhatoda zeylanica.

A primary extract of Adhatoda zeylanica containing Vasicine was obtained from the dried plant material. The method for obtaining said primary extract includes the following steps, which are generally illustrated in the flow chart of FIG. 1.

The plant material of Adhatoda zeylanica was dried and pulverized for extraction. The pulverized plant material was placed in an extraction vessel and extracted by cold percolation using a solvent comprising methanol and water in the ratio of 80:20. The ratio of pulverized plant material to the solvent was 1:5 (wt/Vol). The pulverized plant material was allowed to soak in the solvent for 6-15 hours followed by filtration to afford a residue and filtrate (F1) containing Vasicine in the range from (0.10-0.20% w/w). The residue was subjected to extraction by cold percolation, using a solvent comprising methanol and water in the ratio of 80:20, followed by filtration to afford a residue and filtrate (F2) containing Vasicine in the range from (0.05-0.10% w/w). The ratio of plant material (residue) to solvent in the second extraction was 1:4 (wt/Vol). The residue was again subjected to extraction by cold percolation, using a solvent comprising methanol and water in the ratio of 80:20, followed by filtration to afford a residue and filtrate (F3) containing Vasicine in the range from (0.01-0.05% w/w). The ratio of plant material (residue) to solvent in the third extraction was 1:4 (wt/Vol). Filtrates F1, F2 and F3 were combined and concentrated by evaporating the solvent under a pressure of 1 KgHg at 65° C. to afford a liquid concentrate containing Vasicine in the range from 0.50-1.00% w/w. The liquid concentrate was subjected to spray drying to afford a primary extract containing Vasicine in the range from 1.00-3.00% w/w.

Example 2

Process for Preparing Adhatoda zeylanica Extract Containing Vasicine from the Primary Extract.

About 1-5 kg of primary extract and 2-8 L of water were mixed thoroughly and homogenized in an extraction vessel. After that, 2 L of ethyl alcohol and 4 L of ethyl acetate were added and the mixture was stirred vigorously for 30 minutes to few hours. After allowing the mixture to stand for 1 hour, the upper ethyl acetate layer was collected. 1 L of water was added and mixed with the bottom layer. Thereafter, 1 L of ethyl alcohol and 4 L of ethyl acetate were added to the mixture and stirring was continued for another 30 minutes to few hours. After allowing the mixture to stand for 1 hour, the upper ethyl acetate layer was collected. In a similar manner, the lower aqueous layer was extracted for the third time and the upper ethyl acetate was collected. All the three, ethyl acetate extracts were combined and concentrated, wherein the concentration of Vasicine in the concentrated extract of *Adhatoda zeylanica* was 10,000 ppm.

Example 3

Process for Preparing Extract of *Moringa oleifera*.

About 1-5 kg of *Moringa oleifera* dry leaf powder was slowly added to 3-10 L of ethanol with constant stirring for three hours at 20-35° C. using cold plate. This mixture was allowed to settle down for an hour and the supernatant ethanol layer was collected. Likewise, the residue at the bottom was extracted thrice with ethanol. All the ethanol extracts were combined and distilled under vacuum at 50° C. and concentrated up to 300 mL.

Examples 4-9

Granular Bio-Stimulant Composition Comprising *Adhatoda zeylanica* Extract Containing Vasicine The unit of each value below is "% w/w", i.e., percentage weight by weight, relative to the weight of the composition unless otherwise specified. The composition presented in Table 1 is formulated as granules.

TABLE 1

Examples of granular bio-stimulant composition

| No | Ingredients | 4 | 5 | 6 | 7 | 8 | 9 |
|---|---|---|---|---|---|---|---|
| 1 | Adhatoda zeylanica extract (containing Vasicine) | 0.05 | 0.50 | 1.00 | 4.00 | 20.00 | 45.00 |
| 2 | Carrier | 98.35 | 97.90 | 97.40 | 94.40 | 78.40 | 53.40 |
| 3 | Colorant | 0.10 | 0.10 | 0.10 | 0.10 | 0.10 | 0.10 |
| 4 | Binder/Adhesive | 1.50 | 1.50 | 1.50 | 1.50 | 1.50 | 1.50 |

Examples 10-12

Granular Bio-Stimulant Composition Comprising *Adhatoda zeylanica* Extract Containing Vasicine and Algal Extract.

The unit of each value below is "% w/w", i.e., percentage weight by weight, relative to the weight of the composition unless otherwise specified. The composition presented in Table 2 is formulated as granules.

TABLE 2

Examples of granular bio-stimulant composition

| No | Ingredients | 10 | 11 | 12 |
|---|---|---|---|---|
| 1 | Adhatoda zeylanica extract (containing Vasicine) | 0.05 | 1.00 | 4.00 |
| 2 | Algal extract | 0.01 | 0.50 | 1.00 |
| 3 | Carrier | 98.34 | 96.90 | 93.40 |
| 4 | Colorant | 0.10 | 0.10 | 0.10 |
| 5 | Binder/Adhesive | 1.50 | 1.50 | 1.50 |

Examples 13-17

Granular Bio-Stimulant Composition Comprising *Adhatoda zeylanica* Extract Containing Vasicine and *Moringa oleifera* Extract.

The unit of each value below is "% w/w", i.e., percentage weight by weight, relative to the weight of the composition unless otherwise specified. The composition presented in Table 3 is formulated as granules.

TABLE 3

Examples of granular bio-stimulant composition

| No | Ingredients | 13 | 14 | 15 | 16 | 17 |
|---|---|---|---|---|---|---|
| 1 | Adhatoda zeylanica extract (containing Vasicine) | 0.05 | 1.00 | 1.00 | 0.05 | 4.00 |
| 2 | Moringa oleifera | 0.05 | 0.50 | 1.00 | 0.01 | 1.00 |
| 3 | Carrier | 98.30 | 96.90 | 96.40 | 98.34 | 93.40 |
| 4 | Colorant | 0.10 | 0.10 | 0.10 | 0.10 | 0.10 |
| 5 | Binder/Adhesive | 1.50 | 1.50 | 1.50 | 1.50 | 1.50 |

Example 18

Preparation of Granular Bio-Stimulant Composition Containing *Adhatoda zeylanica* Extract Containing Vasicine. Amounts of Ingredients Used in the Process are Presented in Table 1.

Preparation of first granular mixture: Sieve the carrier (granular) material through 10-30 mesh and dry if moisture content is more than 0.5% w/w. Dissolve required quantity of paraffin wax (adhesive) in hexane, by warming up to 60° C. Spray the hot solution of wax over required quantity of carrier (granules). Dry the granules in a current of hot air to remove the solvent and deposit a layer of adhesive over the carrier.

Preparation of second granular mixture: Dissolve required quantity of *Adhatoda zeylanica* extract containing Vasicine in polar solvent for easy coating of *Adhatoda zeylanica* extract containing Vasicine onto the granules. Take required quantity of Green colour dye and dissolve in a polar solvent. Mix this solution with the solution of *Adhatoda zeylanica* extract containing Vasicine. The solution of *Adhatoda zeylanica* extract containing Vasicine and dye was sprayed onto the wax coated granules (first granular mixture) and dried to remove the solvent.

Finally, the second granular mixture was treated with a hot solution of wax in hexane and dried in a current of air to form the granular bio-stimulant composition.

Example 19

Preparation of Granular Bio-Stimulant Composition Containing *Adhatoda zeylanica* Extract Containing Vasicine and Algal Extracts. Amounts of Ingredients Used in the Process are Presented in Table 2.

Sieve the carrier (granular) material through 10-30 mesh and dry if moisture content is more than 0.50% w/w. Dissolve required quantity of paraffin wax in hexane, by warming up to 60° C. Spray the hot solution of wax over required quantity of carrier (granules). Dry the granules in the current of hot air to remove the solvent. Dissolve required quantity of *Adhatoda zeylanica* extract containing Vasicine and algal extract in polar solvent for easy coating of *Adhatoda zeylanica* extract containing Vasicine and algal extracts onto the granules. Take required quantity of Green colour dye and dissolve in a polar solvent. Mix this solution with the solution of *Adhatoda zeylanica* extract containing Vasicine and algal extract. The solution of *Adhatoda zeylanica* extract containing Vasicine, algal extract and dye was sprayed onto the wax coated granules and dried to remove the solvent. Finally, the granules were again treated with a hot solution of wax in hexane and dried in a current of air to form the granular bio-stimulant composition.

Example 20

Preparation of Granular Bio-Stimulant Composition Containing *Adhatoda zeylanica* Extract Containing Vasicine and *Moringa oleifera* Extract. Amounts of Ingredients Used in the Process are Presented in Table 3.

Sieve the carrier (granular) material through 10-30 mesh and dry if moisture content is more than 0.50% w/w. Dissolve required quantity of paraffin wax in hexane, by warming up to 60° C. Spray the hot solution of wax over required quantity of carrier (granules). Dry the granules in the current of hot air to remove the solvent. Dissolve required quantity of *Adhatoda zeylanica* extract containing Vasicine and *Moringa oleifera* extract in polar solvent for easy coating onto the granules. Take required quantity of Green colour dye and dissolve in a polar solvent. Mix this solution with the solution of *Adhatoda zeylanica* extract containing Vasicine and *Moringa oleifera* extract. The solution of *Adhatoda zeylanica* extract containing Vasicine, *Moringa oleifera* extract and dye was sprayed onto the wax coated granules and dried to remove the solvent. Finally, the granules were again treated with a hot solution of wax in hexane and dried in a current of air to form the granular bio-stimulant composition.

Example 21-29

Liquid Bio-Stimulant Composition for Foliar Application Comprising *Adhatoda zeylanica* Extract Containing Vasicine.

The unit of each value below is "% w/w", i.e., percentage weight by weight, relative to the weight of the composition unless otherwise specified. The composition presented in Table 4 is formulated as liquid bio-stimulant composition for foliar application.

TABLE 4

Examples of liquid bio-stimulant composition for foliar application.

| Formulations | Ingredients | 21 | 22 | 23 | 24 | 25 | 26 | 27 | 28 | 29 |
|---|---|---|---|---|---|---|---|---|---|---|
| 1 | *Adhatoda zeylanica* extract (containing Vasicine) | 0.5 | 1.0 | 2.0 | 4.0 | 25.0 | 45.0 | 1.0 | 2.0 | 4.0 |
| 2 | Non-ionic surfactant | 50.0 | 50.0 | 50.0 | 50.0 | 50.0 | 50.0 | 45.0 | 45.0 | 45.0 |
| 3 | Stablizer | 0.0 | 0.0 | 0.0 | 2.0 | 2.0 | 2.0 | 5.0 | 5.0 | 5.0 |
| 4 | Fillers (Vegetable oils) | 49.5 | 49.0 | 48.0 | 44.0 | 23.0 | 3.0 | 49.0 | 48.0 | 46.0 |

Example 30-34

Liquid Bio-Stimulant Composition for Drip Application Comprising *Adhatoda zeylanica* Extract Containing Vasicine.

The unit of each value below is "% w/w", i.e., percentage weight by weight, relative to the weight of the composition unless otherwise specified. The composition presented in Table 5 is formulated as liquid bio-stimulant composition for drip application.

TABLE 5

Examples of liquid bio-stimulant composition for drip application.

| Formulations | Ingredients | 30 | 31 | 32 | 33 | 34 |
|---|---|---|---|---|---|---|
| 1 | *Adhatoda zeylanica* extract (containing Vasicine) | 0.5 | 1.0 | 2.0 | 4.0 | 25.0 |
| 2 | Non-ionic surfactant | 79.5 | 79.0 | 78.0 | 76.0 | 55.0 |
| 3 | Solvent | 20.0 | 20.0 | 20.0 | 20.0 | 20.0 |

Example 35

Preparation of Liquid Bio-Stimulant Composition Containing *Adhatoda zeylanica* Extract Containing Vasicine for Foliar Application. Amounts of Ingredients Used in the Process are Presented in Table 4.

Take required quantity of the non-ionic surfactant into a mixing vessel and start agitation. Take required quantity of *Adhatoda zeylanica* extract containing Vasicine and add slowly to the non-ionic surfactant while agitating. Continue agitation for two hours until the *Adhatoda zeylanica* extract containing Vasicine dissolves completely in the surfactant. Take required quantity of stabilizer and add slowly into the mixing vessel and continue agitation for an hour. Finally, add required quantity of vegetable oil into the mixing vessel and agitate for an hour to get a homogeneous liquid.

Example 36

Preparation of Liquid Bio-Stimulant Composition Containing *Adhatoda zeylanica* Extract Containing Vasicine for Drip Application. Amounts of Ingredients Used in the Process are Presented in Table 5.

Take required quantity of the non-ionic surfactant into a mixing vessel and start agitation. Take required quantity of *Adhatoda zeylanica* extract containing Vasicine and add slowly to the non-ionic surfactant while agitating. Continue agitation for two hours until the *Adhatoda zeylanica* extract containing Vasicine dissolves completely in the surfactant. Take required quantity of solvent and add slowly into the mixing vessel and continue agitation for an hour.

Example 37

The Plant growth promotion (PGP) effect/bio-stimulant effect/bio-efficacy of granular bio-stimulant composition containing *Adhatoda zeylanica* extract containing Vasicine was evaluated in one square meter pits followed by the validation of results in field trials.

Pit Trials for Granular Bio-Stimulant Composition Containing *Adhatoda zeylanica* Extract Containing Vasicine:

a. Plot preparation: Plots of one square meter and a depth of 1.5 feet were prepared and lined with polythene sheets, to retain the water. After that, the pits were filled with soil mixed with farmyard manure. In the right hand corner of each plot, an outlet was provided to drain excess water.

b. Seed preparation: 100 g of Paddy seeds (procured from the market) were soaked in 250 mL of water for 24 hours. Seeds were washed and wrapped in a wet cloth bag and kept for incubation for 48 hours. The cloth was periodically sprinkled with water. After 48 hours, germinated seeds were sown in plastic trays (12"×16"). The trays were watered periodically and maintained.

c. Transplanting: 25 days after sowing, the seedlings were uprooted from the plastic trays and transplanted to the plots in rows with spacing of 6×6 cm. The plots were watered periodically and maintained.

d. Application: 12 days after transplanting, the application of the granular bio-stimulant was initiated. One gram of sample was mixed with 6 g of sand and applied to a plot with a thin film of standing water. Each plot was tagged with the treatment details. Watering was done on alternate days and excess water was drained off whenever required.

e. Method of Observation:

Observations of plant growth parameters, such as plant height, tillering ability and root length were made 45 days after transplanting.

Plant Height: Plant height was measured, in centimetres, from the surface of the soil to tip of the tallest panicle and recorded in whole numbers.

Tillering ability: Number of tillers in one hill was recorded.

Root Length: The plants were uprooted and the length of the root was measured, in centimetres, from the tip of the root to its junction with the shoot and recorded in whole numbers.

The aforementioned results show that the granular bio-stimulant composition of the present invention promotes growth on application to paddy in pit trials. The results also show that the granular bio-stimulant compositions containing 0.5% and 1% of *Adhatoda zeylanica* extract corresponding to concentrations of 50 ppm and 100 ppm Vasicine respectively are optimum for promoting growth in paddy.

TABLE 6

PGP effect of granular bio-stimulant composition containing *Adhatoda Zeylanica* extract containing Vasicine on paddy in pit trials.

| No | Granular bio-stimulant composition applied to paddy in pit trials | Plant Height (cm) | No of tillers | Root length (cm) |
|---|---|---|---|---|
| 1 | Example 4 | 46.1 (5.7%) | 7.8 (9.9%) | 18.7 (8.1%) |
| 2 | Example 5 | 49.2 (12.8%) | 9.5 (33.8%) | 20.1 (16.2%) |
| 3 | Example 6 | 48.9 (12.2%) | 9.5 (33.8%) | 20.7 (19.7%) |
| 4 | Example 7 | 45.3 (3.9%) | 7.4 (4.2%) | 18.2 (5.2%) |
| 5 (Blank) | Sand- 98.4% Wax-1.5% Colourant-0.1% | 44.1 (1.1%) | 6.6 (−7%) | 17.4 (0.6%) |
| 6 (UTC) | Untreated control | 43.6 | 7.1 | 17.3 |

TABLE 7

PGP effect of Granular bio-stimulant compositions, containing *Adathoda zeylanica* extract containing Vasicine and algal extracts on paddy in pit trials.

| No | Granular bio-stimulant composition applied to paddy in pit trials | Plant Height (cm) | No of tillers |
|---|---|---|---|
| | | (45 days after transplantation) and percent increase relative to untreated control. | |
| 1 | Example 10 | 47.2 (6.8%) | 7.6 (8.6%) |
| 2 | Example 11 | 49.2 (11.3%) | 8.2 (17.1%) |
| 3 | Example 12 | 46.9 (6.1%) | 7.4 (5.7%) |
| 4 (Blank) | Sand - 98.4% w/w Wax - 1.5% w/w Colourant - 0.1% w/w | 44.2 (0%) | 7.1 (1.4%) |
| 5 (UTC) | Untreated control | 44.2 | 7.0 |

TABLE 8

PGP effect of Granular bio-stimulant composition containing *Adhatoda Zeylanica* extract containing Vasicine, and *Moringa oleifera* extract on Paddy in pit trials

| No | Granular Bio-stimulant composition applied to paddy in pit trials | Plant Height (cm) | No of tillers |
|---|---|---|---|
| | | (45 days after transplantation) and percent increase relative to untreated control. | |
| 1 | Example 16 | 48.9 (7.7%) | 8.3 (10.7%) |
| 2 | Example 14 | 50.9 (12.1%) | 8.7 (16.0%) |
| 3 | Example 17 | 50.2 (10.6%) | 8.1 (8.0%) |
| 4 (Blank) | Sand- 98.4% w/w Wax-1.5% w/w Colourant-0.1% w/w | 45.7 (0.7%) | 7.4 (−1.3%) |
| 5 (UTC) | Untreated control | 45.4 | 7.5 |

Example 38

For validating the results of the pit trials, field trials were conducted for determining the optimum composition of the granular bio-stimulant composition for improving growth and yield of paddy. The variety of Paddy chosen for the trial was ASD 16.

Field Trials for Granular Bio-Stimulant Composition:

This trial protocol applies to Granular bio-stimulant compositions with *Adhatoda zeylanica* extract containing Vasicine.

a. Transplanting: 25 days after sowing, the seedlings were uprooted from the nursery and transplanted into the plots, in rows, with a spacing of 6×6 cm. The plots were watered as per farm practices.

b. Application: 12 days after transplanting, the application of the granular bio-stimulant was initiated. All the compositions were applied at the rate of of 4 kg/acre. The granular bio-stimulant compositions were applied by mixing with required quantity of sand.

c. Method of Observation:

Observation of plant growth parameters: Observations of plant growth parameters, such as plant height and number of tillers were made 45 days after transplanting. Plant height is the length, measured in centimetres, from the surface of the soil to the tip of the tallest panicle and recorded as a whole number. The tillering ability was measured by counting the number of tillers in one hill.

Observation of Yield: Grain yield was calculated by harvesting 1 square meter. For a particular composition, harvesting was carried out in an area of 1 square meter at 5 locations, and the mean was calculated. These results were then extrapolated to calculate the yield per acre.

TABLE 9

PGP effect of granular bio-stimulant composition containing *Adhatoda Zeylanica* extract containing Vasicine in field trials on Paddy

| No | Granular bio-stimulant composition applied to paddy in field trials | Plant Height (cm) | No of tillers | Grain Yield (kg/acre) |
|---|---|---|---|---|
| | | Plant growth parameters (45 days after transplantation) and percent increase relative to untreated control. | | Yield |
| 1 | Example 4 | 60.8 (3.9%) | 22 (10%) | 3160 (8.4%) |
| 2 | Example 5 | 62.7 (7.2%) | 24 (20%) | 3225 (10.7%) |
| 3 | Example 6 | 62.3 (6.5%) | 24 (20%) | 3219 (10.5%) |
| 4 | Example 7 | 60.5 (3.4%) | 23 (15%) | 3098 (6.3%) |
| 5 (Blank) | Sand - 98.4% Wax - 1.5% Colourant - 0.1% | 58.4 (−0.2%) | 21 (5%) | 2922 (0.3%) |
| 6 (UTC) | Untreated control | 58.5 | 20 | 2914 |

From the field experiments it is clear that application of granular bio-stimulant composition containing *Adhatoda zeylanica* extract containing Vasicine at 0.50% and 1.00% (equivalent to a Vasicine content of 50 ppm & 100 ppm respectively) has positive impact on the plant growth and yield.

Example 39

The PGP effect/bio-stimulant effect/bio-efficacy of liquid bio-stimulant composition for foliar spray was evaluated preliminarily in Leonard Jar experiments followed by the validation of results in pot studies.

Leonard Jar Experiment for Liquid Bio-Stimulant Composition a. Preparation of Leonard Jar:—A beer bottle of 500-800 ml capacity was cut into two pieces (The bottle was cut at a point where it begins to taper to give a neck containing part and a bottom part). Dark brown bottle was preferred for the experiment to prevent light from entering it. Neck portion of the bottle was wrapped with a bandage cloth. Hang a cotton wick of 8 cm from the bandage cloth and place on the other half of the bottle containing 400 ml of the test solution (Hoagland solution with or without the chemical). Add 250 g of sieved sand into the inverted bottle neck. Care needs to be taken to ensure that the wick hung from the bandage cloth, which holds soil, touches the Hoagland solution. This helps the wick to imbibe the Hoagland solution from the bottom container and supply it to the top portion where seedlings and sand are placed.

b. Seedling: Twenty day old chilli seedlings procured from commercial nursery (free from disease and insect attack) were used in the study. The seedlings were watered before transplanting to Leonard jar.

c. Transplanting of seedling: Chilli seedlings (20 day old) with uniform height and no. of leaves were selected for transplanting into Leonard jar. Thereafter, the whole setup was kept in an open field. Sufficient number of replicates was kept for each treatment.

d. Preparation of spray solution and spraying: Three days after transplanting, the seedlings were sprayed with the liquid bio-stimulant formulation followed by another spray with the liquid bio-stimulant at an interval of 15 days. The bio-stimulant composition was sprayed using a hand sprayer on the chilli plant foliage till the spray fluid started rolling and dripping from the leaves.

e. Observation: Observations on plant height, root length & no. of leaves were made 7 days after second spray.

TABLE 10

PGP effect of liquid bio-stimulant composition for foliar application in Leonard Jar experiments on Chilli:

| No | Liquid bio-stimulant composition applied to chilli in Leonard Jar Experiments | Plant growth parameters (60 days after Transplanting) and percent increase relative to untreated control. | | |
|---|---|---|---|---|
| | | Plant height (cm) | Root Length (cm) | No of Leaves |
| 1 | Example 27 | 32.4 (15.3%) | 21.9 (17.1%) | 14.2 (7.6%) |
| 2 | Example 28 | 34.6 (23.1%) | 23.5 (25.7%) | 14.8 (12.1%) |
| 3 | Example 29 | 33.7 (19.9%) | 22.4 (19.8%) | 14.4 (9.1%) |
| 4 (Blank) | Poly oxy ethylene sorbiton tri oleate- 45% Fatty acid methyl ester- 5% Sunflower oil/ sesame oil- 50% | 28.2 (0.4%) | 18.9 (1.1%) | 13.5 (2.3%) |
| 5 (UTC) | Untreated control | 28.1 | 18.7 | 13.2 |

The aforementioned results show that the liquid bio-stimulant composition of the present invention promotes growth on application to chilli plant in Leonard Jar experiments. From the results it is also evident that *Adhatoda zeylanica* extract at 2% concentration (200 ppm Vasicine content) is optimum for promoting growth in chilli plant.

Example 40

For validating the results of the Leonard Jar experiments, pot trials were conducted for determining the optimum composition of the liquid bio-stimulant composition for improving growth and yield of chilli plant.

Pot Experiments for Liquid Bio-Stimulant Composition for Foliar Application:
a. Filling of pots: The experiments were carried out in earthern pots of 24×24 inch dimension. Pots were filled with a potting mixture (red soil, sand and dried cow dung at a ratio of 2:1:1).
b. Procurement of chilli seedlings: 15-day old chilli (variety NS1761) seedlings were procured from nursery and transplanted into pots. Potted chilli plants were watered daily in the morning and regularly checked for pest and diseases. One week after transplantation, fertilizer (NPK 19:19:19) was applied at the rate of 10 g per pot.
c. Preparation of spray solution and spraying details: Spray solution was prepared by measuring 2 mL of liquid formulation of *Adhatoda zeylanica* extract and diluting upto 1 L with water. The first spraying of the liquid biostimulant formulation on the chilli plants was carried out three days after transplanting followed by another one at an interval of 15 days. The solution was sprayed using a hand sprayer till the spray fluid started rolling and dripping from the leaves.

TABLE 11

PGP effect of liquid bio-stimulant composition for foliar application in Pot trials on Chilli

| No | Liquid bio-stimulant composition applied to chilli in pot trials | Plant growth parameters (60 days after Transplanting) and percent increase relative to untreated control | | Yield |
|---|---|---|---|---|
| | | Shoot Length (cm) | No of Branches | Fruit Yield (gm/plant) |
| 1 | Example 27 | 43.1 (7.2%) | 18.5 (11.4%) | 670 (9.8%) |
| 2 | Example 28 | 45.8 (13.9%) | 18.8 (13.3%) | 700 (14.8%) |
| 3 | Example 29 | 43.9 (9.2%) | 18.1 (9.0%) | 658 (7.9%) |
| 4 (Blank) | Poly oxy ethylene sorbiton tri oleate- 45% Fatty acid methyl ester- 5% Sunflower oil/ sesame oil- 50% | 40.6 (1.0%) | 16.9 (1.8%) | 615 (0.8%) |
| 5 (UTC) | Untreated control | 40.2 | 16.6 | 610 |

Based on the pot trials, it is evident that liquid bio-stimulant composition containing *Adhatoda zeylanica* extract at 2% concentration (200 ppm Vasicine content) is optimum for promoting growth and yield in chilli plant.

Example 41

Pot trials were conducted for determining the optimum composition of the liquid bio-stimulant composition for drip application for improving growth and yield of tomato plant.

Pot Experiment for Liquid Bio-Stimulant Composition for Drip Application:

Seed germination: Tomato seeds (Naamdhari 501) procured from commercial market was used for the study. Procured seeds were sowed in portrays with coco peat and then moistened with water. The germinated seedling were watered and raised in the same portray for 20 days. After 30 days the plants were transplanted to the earthen pots.

Preparation of pots: Earthen pots of 12×12 inch were used for the study. Pots were filled with potting mixture (red soil, sand and dried cow dung at a ratio of 2:1:1) and 30 days old seedlings were transplanted from portrays to the pots. Potted tomato plants were watered daily in the morning and regularly checked for pests and diseases. 15 days after transplantation one fertilizer application was given with NPK 19:19:19 fertilizer.

Preparation of Drip solution: 20 days after transplanting, the biostimulant composition was applied to the potted plants through drip irrigation.

TABLE 12

PGP effect of liquid bio-stimulant composition for drip application in Pot trials on Tomato plants.

| No | Bio-stimulant composition applied to Tomato in pot trials | Plant Height (cm) | No of Branches |
|---|---|---|---|
| 1 | Example 30 | 66.80 (11.0%) | 5.71 (14.9%) |
| 2 | Example 31 | 68.10 (13.1%) | 5.93 (19.3%) |
| 3 | Example 32 | 66.10 (9.8%) | 5.66 (13.9%) |
| 4 (Blank) | Example 33 | 64.30 (6.8%) | 5.16 (3.8%) |
| 5 (Blank) | Non-ionic surfactant- 80% w/w Solvent- 20% w/w | 60.40 (0.3%) | 4.99 (0.4%) |
| 6 (UTC) | Untreated control | 60.20 | 4.97 |

(60 days after transplanting) and percent increase relative to untreated control.

Based on the pot trials, it is evident that the liquid bio-stimulant composition for drip application containing *Adhatoda zeylanica* extract containing Vasicine at 0.5% and 1% concentration corresponding to 50 ppm and 100 ppm Vasicine content is optimum for promoting growth in tomato plant.

Example 42

Phytotoxicity of Liquid Bio-Stimulant Composition for Foliar Application:

Phytotoxicity of a liquid bio-stimulant composition for foliar application containing *Adhatoda zeylanica* extract (2%, containing 200 ppm Vasicine) was evaluated by spraying it on Mulberry plants. A test solution was prepared by measuring 1 mL of the liquid bio-stimulant composition and diluting it up to 1 L with water. Likewise, test solutions were prepared containing 2 mL and 4 mL of the liquid bio-stimulant composition. The test parameters were phytotoxicity symptoms, such as scorching, wilting, necrosis, vein clearing, epinasty and hyponasty.

Methodology:

The plants with new shoots were selected and tagged with treatment details. The test solutions were sprayed using a hand sprayer. The plants were drenched with the test solutions and water was sprayed on untreated control plants.

Method of Observation:

Observations were recorded 24 hours after treatment and up to seven days. The parameters such as scorching, wilting, necrosis, vein clearing, epinasty and hyponasty, which are defined below, were considered for observation. The percentage phytotoxicity symptoms were rated as per the scale given below.

TABLE 13

Phyto-toxicity rating Chart

| Scale | Phytotoxicity (%) |
|---|---|
| 0 | No phytotoxicity |
| 1 | 1-10 |
| 2 | 11-20 |
| 3 | 21-30 |
| 4 | 31-40 |
| 5 | 41-50 |
| 6 | 51-60 |
| 7 | 61-70 |
| 8 | 71-80 |
| 9 | 81-90 |
| 10 | 91-100 |
| — | — |

Scorching: To burn superficially, to discolor or damage the texture of leaf, to wither or parch with intense heat.

Wilting: The symptoms of drooping of plant and wilting of entire branch/shoot/leaf.

Necrosis: Death of cells or tissues through injury or disease, especially in a localized area of the body.

Vein clearing: Clearance of leafy matter, devoid of chlorophyll and other ingredients of leaf excepting the skeleton.

Epinasty: A downward bending of leaves or other plant parts, resulting from excessive growth of the upper side.

Hyponasty: An upward bending of leaves or other plant parts, resulting from growth of the lower side.

TABLE 14

Phytotoxicity of liquid bio-stimulant composition for foliar application on Mulberry Plants

| No | Liquid bio-stimulant composition Test Plant: Mulberry | Test Solution | Phytotoxicity (Rating) 7 DAT | | | | | |
| | | | Scorching | Wilting | Necrosis | Vein Clearing | Epinasty | Hyponasty |
|---|---|---|---|---|---|---|---|---|
| 1 | Example 28 | 1 ml/litre | 0 | 0 | 0 | 0 | 0 | 0 |
| 2 | Example 28 | 2 ml/litre | 0 | 0 | 0 | 0 | 0 | 0 |
| 3 | Example 28 | 4 ml/litre | 0 | 0 | 0 | 0 | 0 | 0 |
| 4 | Untreated control (Water Spray) | | 0 | 0 | 0 | 0 | 0 | 0 |

From the phyto-toxicity results, it is evident that liquid bio-stimulant composition containing *Adhatoda zeylanica* extract (containing Vasicine) has no phyto-toxic effect on plants at all tested concentrations.

While particular embodiments of the bio-stimulant composition of present invention have been illustrated and described, it would be obvious to those skilled in the art that various other changes and modifications can be made without departing from the spirit and scope of the invention. It is thereof intended to cover in the appended claims such changes and modifications that are within the scope of the invention.

What is claimed is:

1. A method for preparing a bio-stimulant composition for promoting plant growth, comprising the steps of: (a) coating a carrier with a layer of an adhesive to obtain a first granular mixture; (b) coating the first granular mixture with an *Adhatoda zeylanica* extract containing Vasicine and a colorant, and drying to obtain a second granular mixture; and (c) coating the second granular mixture with a layer of an adhesive and drying to prepare the granular bio-stimulant composition.

2. The method of claim 1, further comprising coating the first granular mixture with *Moringa oleifera* extract and/or algal extract.

3. The method of claim 1, wherein the carrier is selected from the group consisting of quartz sand, bentonite and combinations thereof, and wherein the carrier is present in an amount in the range from 48.50-98.35%.

4. The method of claim 1, wherein the adhesive is selected from the group consisting of beeswax, paraffin wax, vegetable wax, and combinations thereof, and the adhesive is present in an amount in the range from 0.05-4.00%.

5. The method of claim 1, wherein the colorant is present in an amount in the range from 0.01-0.40%.

6. The method of claim 1, wherein the *Adhatoda zeylanica* extract containing Vasicine is dissolved in a polar solvent to obtain a first solution.

7. The method of claim 6, wherein the colorant is dissolved in the polar solvent and is added to the first solution containing *Adhatoda zeylanica* extract containing Vasicine to obtain a second solution containing colorant and *Adhatoda zeylanica* extract containing Vasicine.

8. The method of claim 7, wherein the second solution containing colorant and *Adhatoda zeylanica* extract containing Vasicine is sprayed onto the first granular mixture and dried to obtain the second granular mixture.

9. The method of claim 1, further comprising coating the first granular mixture with *Moringa oleifera* extract, wherein the *Adhatoda zeylanica* extract containing Vasicine and *Moringa oleifera* is dissolved in a polar solvent to obtain a first solution.

10. The method of claim 9, wherein the colorant is dissolved in the polar solvent and is added to the first solution containing *Adhatoda zeylanica* extract containing Vasicine and *Moringa oleifera* to obtain a second solution containing colorant and *Adhatoda zeylanica* extract containing Vasicine and *Moringa oleifera*.

11. The method of claim 10, wherein the second solution containing colorant and *Adhatoda zeylanica* extract containing Vasicine and *Moringa oleifera* is sprayed onto the first granular mixture and dried to obtain the second granular mixture.

12. The method of claim 1, further comprising coating the first granular mixture with algal extract, wherein the *Adhatoda zeylanica* extract containing Vasicine and algal extract is dissolved in a polar solvent to obtain a first solution.

13. The method of claim 12, wherein the colorant is dissolved in the polar solvent and is added to the first solution containing *Adhatoda zeylanica* extract containing Vasicine and algal extract to obtain a second solution containing colorant and *Adhatoda zeylanica* extract containing Vasicine and algal extract.

14. The method of claim 13, wherein the second solution containing colorant and *Adhatoda zeylanica* extract containing Vasicine and algal extract is sprayed onto the first granular mixture and dried to obtain the second granular mixture.

* * * * *